US012777376B2

(12) United States Patent
Jiang

(10) Patent No.: US 12,777,376 B2
(45) Date of Patent: Oct. 27, 2026

(54) METHOD AND DEVICE FOR PROCESSING SLICE SERVICE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 445 days.

(21) Appl. No.: 17/921,079

(22) PCT Filed: Apr. 24, 2020

(86) PCT No.: PCT/CN2020/086844
§ 371 (c)(1),
(2) Date: Oct. 24, 2022

(87) PCT Pub. No.: WO2021/212515
PCT Pub. Date: Oct. 28, 2021

(65) Prior Publication Data

US 2023/0171647 A1 Jun. 1, 2023

(51) Int. Cl.
*H04W 36/00* (2009.01)
*H04W 4/70* (2018.01)
*H04W 8/18* (2009.01)
*H04W 36/30* (2009.01)

(52) U.S. Cl.
CPC ... *H04W 36/0022* (2013.01); *H04W 36/0055* (2013.01)

(58) Field of Classification Search
CPC ......... H04W 36/0022; H04W 36/0055; H04W 36/0064; H04W 36/13; H04W 8/18; H04W 4/70; H04W 36/0011; H04W 36/30
USPC .......................................................... 370/329
See application file for complete search history.

(56) References Cited

U.S. PATENT DOCUMENTS

| | | | | |
|---|---|---|---|---|
| 2018/0324577 | A1* | 11/2018 | Faccin | H04W 76/27 |
| 2018/0324645 | A1 | 11/2018 | Park et al. | |
| 2019/0141606 | A1* | 5/2019 | Qiao | H04W 48/04 |
| 2019/0159027 | A1 | 5/2019 | Kuge et al. | |
| 2019/0174320 | A1* | 6/2019 | Kodaypak | H04L 41/122 |
| 2019/0327153 | A1 | 10/2019 | Wahlqvist et al. | |

(Continued)

FOREIGN PATENT DOCUMENTS

| | | | |
|---|---|---|---|
| CN | 107295609 | A | 10/2017 |
| CN | 108513290 | A | 9/2018 |
| CN | 109788493 | A | 5/2019 |
| CN | 110838927 | A | 2/2020 |
| WO | 2018176482 | A1 | 10/2018 |

OTHER PUBLICATIONS

The First CNOA issued in Application No. 202080000830.8, dated Nov. 18, 2022, with English translation, (16p).

(Continued)

*Primary Examiner* — Xuan Lu

(74) *Attorney, Agent, or Firm* — Arch & Lake LLP; Hao Tan; Shen Wang

(57) ABSTRACT

A method for processing a slice service is provided. The method is applied to a first device and includes: receiving slice policy information for at least one of a service and a terminal; and determining a slice policy for the at least one of the service and terminal based on the slice policy information. The slice policy is used to determine a slice configuration of the first device for the at least one of the service and the terminal.

20 Claims, 6 Drawing Sheets

(56) References Cited

U.S. PATENT DOCUMENTS

| | | | | |
|---|---|---|---|---|
| 2019/0327670 | A1* | 10/2019 | Bogineni | H04W 36/0022 |
| 2020/0059987 | A1 | 2/2020 | Hong et al. | |
| 2020/0120580 | A1* | 4/2020 | Jin | H04W 48/18 |
| 2021/0014781 | A1* | 1/2021 | Ianev | H04W 48/18 |
| 2021/0153157 | A1* | 5/2021 | Jeong | H04W 8/02 |
| 2021/0219211 | A1* | 7/2021 | Ke | H04W 48/14 |
| 2023/0054288 | A1* | 2/2023 | Gao | H04W 36/0064 |

OTHER PUBLICATIONS

Huawei et al., "Solution for Key Issue 5: NWDAF-Assisted QoS Profile Provisioning" SA WG2 Meeting #127, S2-186272, Sanya, China, Apr. 16-20, 2018, (6p).

Nokia et al., "Update of Principle for Selection of RAN part of Network Slice" 3GPP TSG-RAN WG3 Meeting #93bis, R3-162403, Sophia Antipolis, France, Oct. 10-14, 2016, (4p).

Notice of Allowance of Chinese Application No. 202080000830.8 dated Jun. 30, 2023 with partial English translation, (4p).

International Search Report issued in Application No. PCT/CN2020/086844 dated Jan. 26, 2021 with English translation,(5p).

Huawei et al., "Slice Availability for Cell (Re-)Selection", 3GPP TSG-RAN WG2 Adhoc#2, R2-1706775, Qingdao, China, May 27-29, 2017, (4p).

The First CNOA issued in Application No. 21208493.3, dated Nov. 18, 2022, with English translation, (16p).

* cited by examiner

METHOD AND DEVICE FOR PROCESSING SLICE SERVICE

CROSS-REFERENCE TO RELATED APPLICATIONS

The present application is the U.S. National Stage of International Application No. PCT/CN2020/086844 filed on Apr. 24, 2020, the entire contents of which are incorporated herein by reference for all purposes.

TECHNICAL FIELD

The present disclosure relates to the communication technical field, in particular to a method for processing a slice service, a device for processing a slice service and a storage medium.

BACKGROUND

The network slicing (NS) technology has been introduced in the fifth generation mobile communication system (5G). The network slicing technology allows a network (a core network and a radio access network) to be divided into a plurality of slices, and different services are transmitted in different slices without interfering with each other.

Supports for different slice services of the network are not uniform across the network, but are based on a tracking area (TA) as a unit. All cells within one TA support the same slice (one or more), but slices supported by cells within different TAs are different.

When there is a service switch, for example, a switch based on an NG or Xn interface, if a target base station does not support a corresponding slice for a service, it will release the service, which will lead to a service interruption and thus affect the quality of service (QoS) of the service.

SUMMARY

The present disclosure provides a method for processing a slice service, a device for processing a slice service and a storage medium.

A first aspect of the present disclosure provides a method for processing a slice service, applied to a first device and including:

- receiving slice policy information for at least one of a service or a terminal, that is, the service, the terminal, or the service and the terminal; and
- determining a slice policy for the at least one of the service and the terminal based on the slice policy information, where the slice policy is configured to determine a slice configuration of the first device for the at least one of the service and the terminal.

A second aspect of the present disclosure provides a method for processing a slice service, applied to a second device and including:

- determining slice policy information for at least one of a service and/a terminal, where the slice policy information is configured for a first device to determine a slice policy for the at least one of the service and the terminal, and the slice policy is configured to determine a slice configuration of the first device for the at least one of the service and the terminal; and
- sending the slice policy information for the at least one of the service and the terminal.

A third aspect of the present disclosure provides a method for processing a slice service, applied to a third device and including:

- receiving, from a first device, slice configuration information, where the slice configuration information indicates a radio access network slice configuration of the first device for at least one of a service and a terminal; and
- determining, based on the slice configuration information, a core network slice configuration of the third device for the at least one of the service and the terminal.

BRIEF DESCRIPTION OF THE DRAWINGS

The accompanying drawings herein, which are incorporated into and constitute a part of the specification, illustrate embodiments consistent with the present disclosure, and together with the specification, serve to explain the principle of the present disclosure.

DETAILED DESCRIPTION

Exemplary embodiments will be described in detail herein, examples of which are illustrated in the accompanying drawings. When the following description is made with reference to the drawings, the same numerals in different drawings refer to the same or similar elements unless otherwise indicated. The implementations described in the embodiments below are not intended to represent all implementations of the present disclosure. Rather, they are merely examples of devices and methods according to some aspects of the present disclosure as recited in the appended claims.

Figure 1:
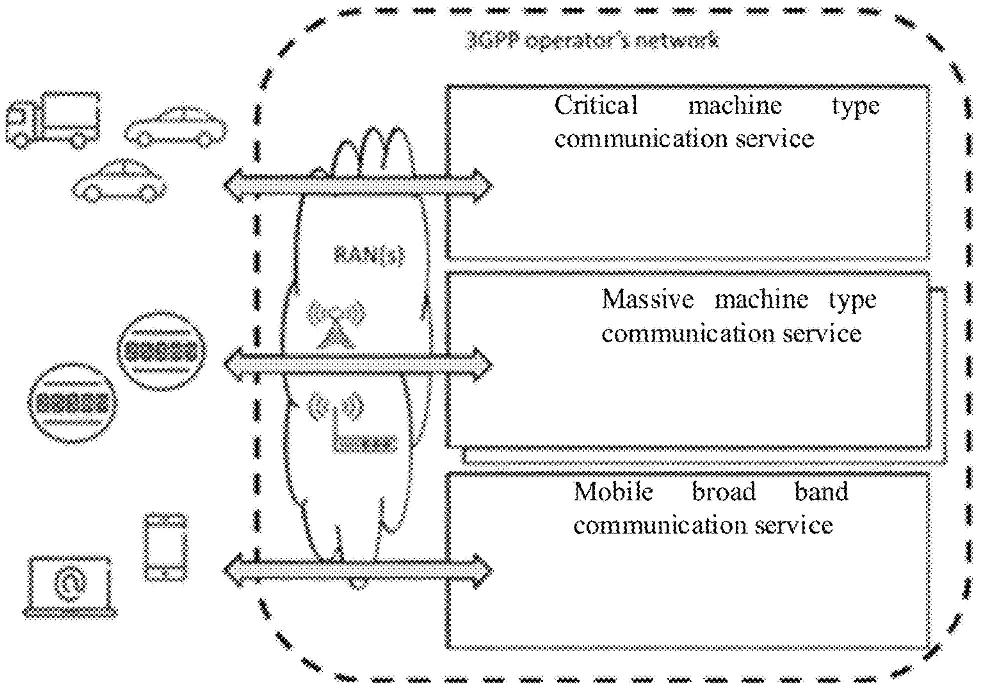
FIG. 1 is a schematic diagram of a slice service processing according to an embodiment.

A method for processing a slice service provided by an embodiment of the present disclosure is applied to a communication network in which the network slicing technique is introduced. The application of the network slicing technique allows different services to be transmitted in different slices without interfering with each other. FIG. 1 is a schematic diagram of a slice service processing according to an embodiment. Referring to FIG. 1, three different types of services for critical Machine Type Communications (critical MTC), massive Machine Type Communications (mMTC) and Mobile Broad Band (MBB) such as health monitoring device data service, meter reading service and video service are divided into three different slices, and the respective slices are different in terms of billing policy, security policy and QoS policy. Large-scale service congestion in one slice will not affect the normal operation of services in other slices.

Figure 2:
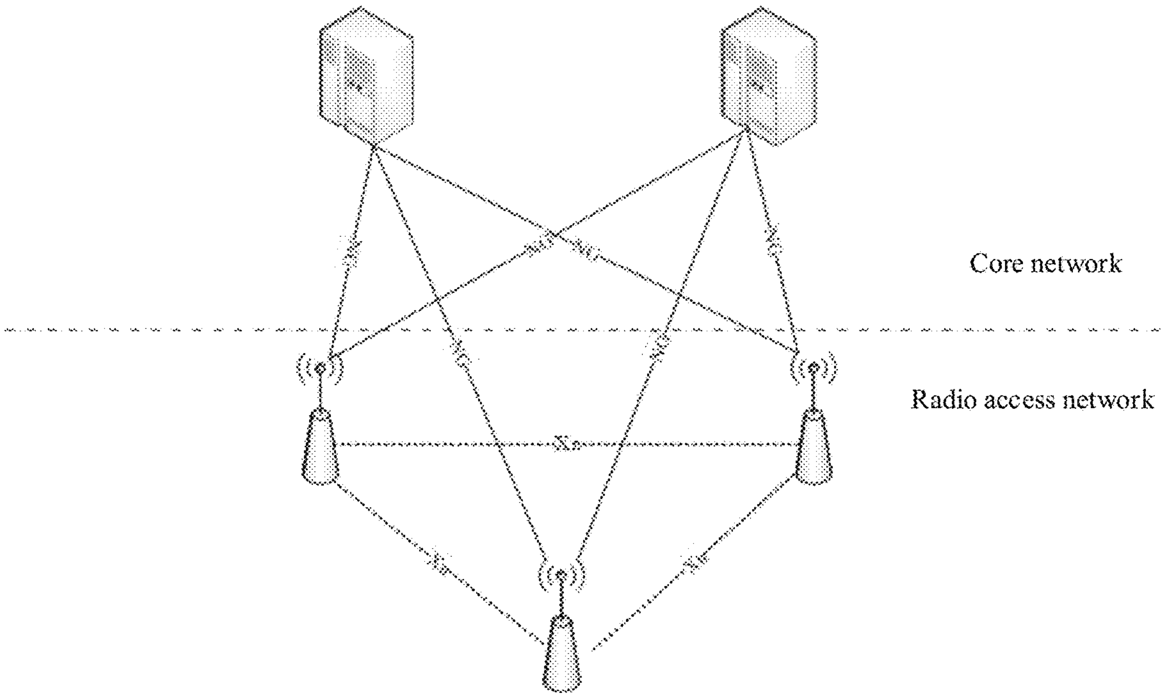
FIG. 2 is a diagram of a wireless communication system architecture according to an embodiment.

The method for processing the slice service may be applied to a wireless communication system shown in FIG. 2. A terminal is connected to a radio access network (RAN) through an RAN network device such as a base station, and a network device at the RAN side and a network device at a core network (CN) side complete the backhaul and forward pass of data for various communication services.

It can be understood that in an embodiment, the wireless communication system may be a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency division multiple access (OFDMA), single carrier FDMA (SC-FDMA), and carrier sense multiple access with collision avoidance (CSMA). Depending on factors such as capacity, speed and latency of the network, the network may be classified as a 2G (generation) network, a 3G network, a 4G network or a future evolution network, such as a 5G network, which may also be referred to as a New Radio (NR) network. For ease of description, the radio communication network in the present disclosure will sometimes be simply referred as a network.

Further, the radio access network device involved in the present disclosure may be: a base station, an evolved node B (base station), a home base station, an access point (AP) in a wireless fidelity (WIFI) system, a wireless relay node, a wireless backhaul node, a transmission point (TP) or transmission and reception point (TRP), a gNB in an NR system, or a component or a part of a base station. In a vehicle-to-everything (V2X) communication system, the network device may also be an in-vehicle device. It shall be understood that in the embodiments of the present disclosure, the specific technology and the specific device form used for the network device are not limited.

Further, the core network device involved in the present disclosure may include an access and mobility management function (AMF), a mobility management entity (MME), a policy charging function (PCF)/policy and charging rule function (PCRF), a core network gateway and the like. Further, a terminal involved in the present disclosure may also be referred to as a terminal device, user equipment (UE), mobile station (MS), mobile terminal (MT) and the like, which is a device that provides voice and/or data connectivity to a user, for example, the terminal may be a handheld device and a vehicle-mounted device with wireless connectivity and the like. Currently, for example, the terminal may be a mobile phone, pocket personal computer (PPC), palm pilot, personal digital assistant (PDA), laptop, tablet, wearable device, in-vehicle device or the like. In addition, in a vehicle-to-everything (V2X) communication system, the terminal device may also be an in-vehicle device. It shall be understood that in the embodiments of the present disclosure, the specific technology and the specific device form used for the terminal are not limited.

When the terminal performs an initial wireless access, the terminal may carry network slice selection assistance information (NSSAI) in the radio resource control (RRC) and non-access stratum (NAS) messages. The NSSAI is configured to indicate the type of slice or service and may also contain some other information to assist in the selection of slices for the RAN/CN. The NSSAI information of the terminal may have be configured in the terminal (each Public Land Mobile Network (PLMN)) respectively, which is called configured NSSAI, and the address of which may be changed over the air. There may also be a predefined (default) NSSAI (which may be written into the terminal at the factory), which may be provided to the network when it is not configured in the terminal. A terminal may be configured with a plurality of CN slices. An NSSAI contains a plurality of single-NSSAIs (S-NSSAI).

Supports for different slice services of the network are not uniform across the network, but are based on a tracking area (TA) as a unit. All cells within one TA support the same slice (one or more), but slices supported by cells within different TAs are different.

In the relevant technology, there may be a switch of a service and/or a terminal based on an NG or Xn interface in the communication process. When there is the switch of the service and/or terminal based on the NG and/or Xn interface, if a network device (target base station) after the switch does not support the slice corresponding to the service and/or terminal, the service and/or terminal will be released, resulting in service interruption and thus significantly affecting the QoS of the service.

In fact, when an original slice cannot be provided to carry the service, a new slice may be considered to carry the service, which to some extent ensures the QoS of the service without interrupting the service.

In view of above, an embodiment of the present disclosure provides a method for processing a slice service to determine a slice policy for a service and/or terminal based on slice policy information for the service and/or terminal, so as to determine a policy configuration for the service and/or terminal.

Figure 3:
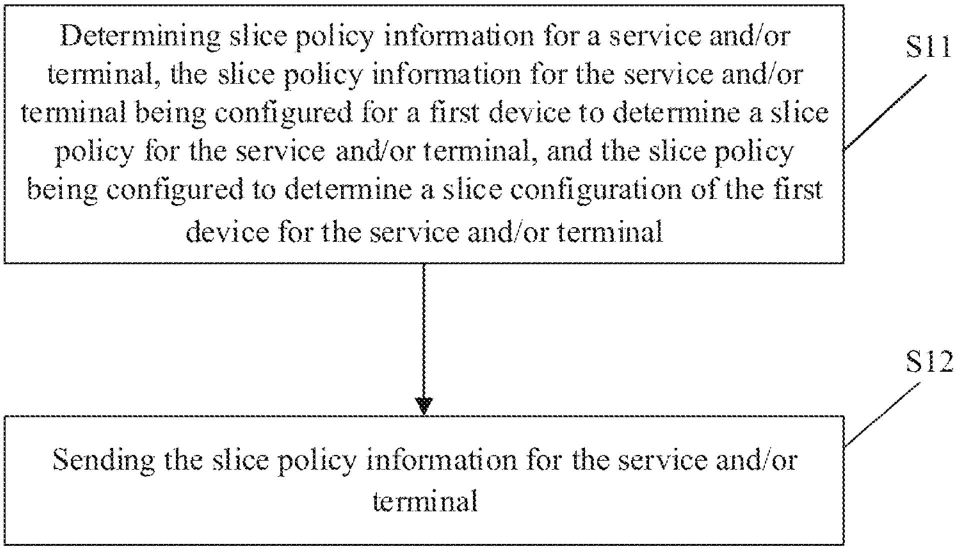
FIG. 3 is a flowchart of a method for processing a slice service according to an embodiment.

FIG. 3 is a flow diagram of a method for processing a slice service according to an embodiment, and the method for processing the slice service is applied in a second device. The second device may be understood to be a device that sends slice policy information for the service and/or terminal, for example, it may be a network device (source base station), AMF/MME and the like before the switch of the service and/or terminal. Referring to FIG. 3, the method for processing the slice service includes:

step S11, determining slice policy information for a service and/or terminal, the slice policy information for the service and/or terminal being configured for a first device to determine a slice policy for the service and/or terminal, and the slice policy being configured to determine a slice configuration of the first device for the service and/or terminal; and step S12, sending the slice policy information for the service and/or terminal.

Figure 4:
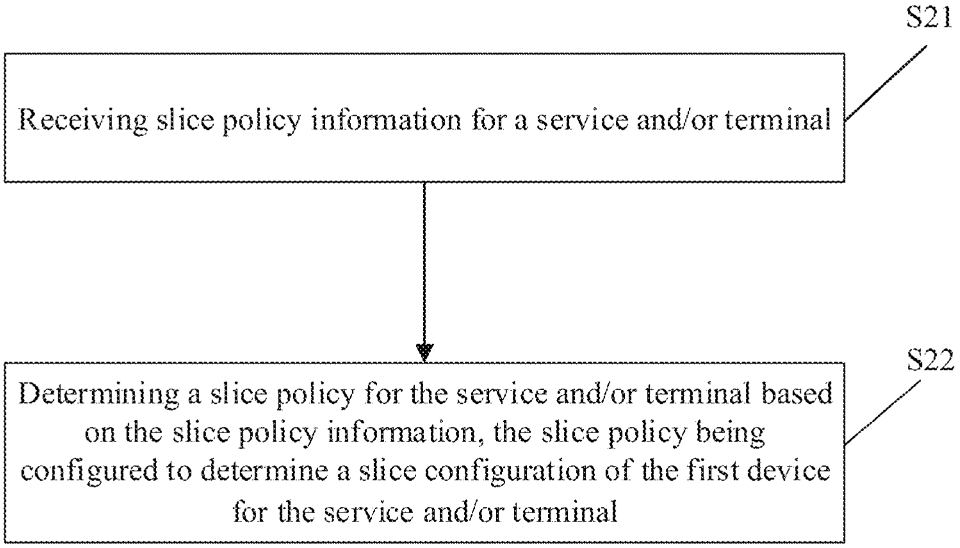
FIG. 4 is a flowchart of a method for processing a slice service according to an embodiment.

FIG. 4 is a flow diagram of a method for processing a slice service according to an embodiment, and the method for processing the slice service is applied in a first device. The first device may be understood to be a device that receives the slice policy information for the service and/or terminal, for example, it may be a network device (target base station) and the like after the switch of the service and/or terminal. Referring to FIG. 4, the method for processing the slice service includes:

step S21, receiving slice policy information for a service and/or terminal; and step S22, determining a slice policy for the service and/or terminal based on the slice policy information, the slice policy being configured to determine a slice configuration of the first device for the service and/or terminal.

In an embodiment of the present disclosure, a PCF sends a route selection policy for the service and/or terminal to an AMF/MME. The route selection policy includes slice policy information. The slice policy information provided by the PCF may be used by a core network and/or radio access network to configure the slice policy respectively. For example, the slice policy information used by the core network may be a slice policy configured based on the slice policy information provided by the PCF, which may be whether the fallback of the slice is allowed, a target slice, an alternative slice, whether slices selected by the core network and the RAN need to be the same and the like. When the switch of the service and/or terminal based on the NG interface occurs, the source base station sends a switch indication to the AMF/MME, which determines the slice policy of the AMF/MME based on the slice policy information adopted by the core network and sends the slice policy information for the service and/or terminal to the target base station (the first device). The first device receives the slice policy information for the service and/or terminal, and determines the slice policy for the service and/or terminal based on the slice policy information. The slice policy determined by the first device is configured to determine a slice configuration of the first device for the service and/or terminal.

The AMF/MME sends the slice policy information provided by the PCF to a radio access network device, such as a source base station of the service and/or terminal. When the switch of the service and/or terminal based on the Xn interface occurs, the source base station determines the slice policy information for the service and/or terminal based on the received slice policy information and sends the slice policy information for the service and/or terminal to the target base station (the first device). The first device receives the slice policy information for the service and/or terminal and determines the slice policy for the service and/or terminal based on the slice policy information. The slice policy determined by the first device is configured to determine a slice configuration of the first device for the service and/or terminal.

The slice policy information for the service and/or terminal involved in an embodiment of the present disclosure may include one or a combination of information associated with a slice fallback; slice information for determining the slice used by the first device for the service and/or terminal; a matching relationship between a slice for a core network and a slice for a radio access network; an area in which the slice policy information comes into effect; a time at which the slice policy information comes into effect; and a usage restriction for the slice.

The information associated with the slice fallback may, for example, be indication information indicating whether the slice fallback is allowed. For example, the information associated with the slice fallback may be an indication for performing the slice fallback for the current service or terminal, or may be a condition for the slice fallback and the like. Whether the slice fallback is allowed means whether the service carried on the slice may be fallback to not be carried via the slice.

The slice information for determining the slice used by the first device for the service and/or terminal may be a target slice, an alternative slice and/or a slice list for the first device. For example, the slice information for determining the slice used by the first device to carry the service may include an explicit indication of a target slice for carrying the service, the target slice is a slice with a first priority for carrying the service. The slice information for determining the slice used by the first device to carry the service may include a target slice and an alternative slice, i.e., when the service cannot be carried by the target slice, the service may be carried by the alternative slice. Further, if there are a plurality of alternative slices, the plurality of alternative slices may each be assigned a priority. The slice information for determining the slice used by the first device to carry the service may include a slice list containing a set of slices, and the priority of slice is determined according to the order thereof in the list, or is indicated according to the priority indication information respectively. The first device preferentially uses the slice with a highest priority in the slice list.

The matching relationship between the slice for the core network and the slice for the radio access network may be understood as indicating whether the slice for the core network is consistent with the slice for the radio access network or a fixed mapping relationship between the slice for the core network and the slice for the radio access network, and the like.

The (effective) area in which the slice policy information comes into effect may be indicated by a tracking area identifier (TAI) or a cell identifier. In an embodiment of the present disclosure, the target slice/alternative slice/whether the fallback is allowed/whether the slices selected by the core network and RAN need to be consistent and the like may have different configurations for different areas.

The (effective) time at which the slice policy information comes into effect may be used to indicate the time period during which the particular slice policy information is valid, i.e., during which the particular policy information can be effective. For example, the radio access network device performs slice configuration operations such as slice selection and slice fallback based on the slice policy information during the effective time period.

The usage restriction for the slice may be used to indicate which slices cannot be used at the same time, for example, indicate that if one of the slices is being used, the other slices cannot be used. The effective time and slice usage restriction for the slice policy information may be configured separately for the radio access network and the core network.

The present disclosure discloses another method for processing a slice in which a first device may send slice configuration information to a core network (core network device, e.g., AMF/MME), and the core network determines a slice configuration used by the core network based on the slice configuration information and/or slice policy information.

Figure 5:
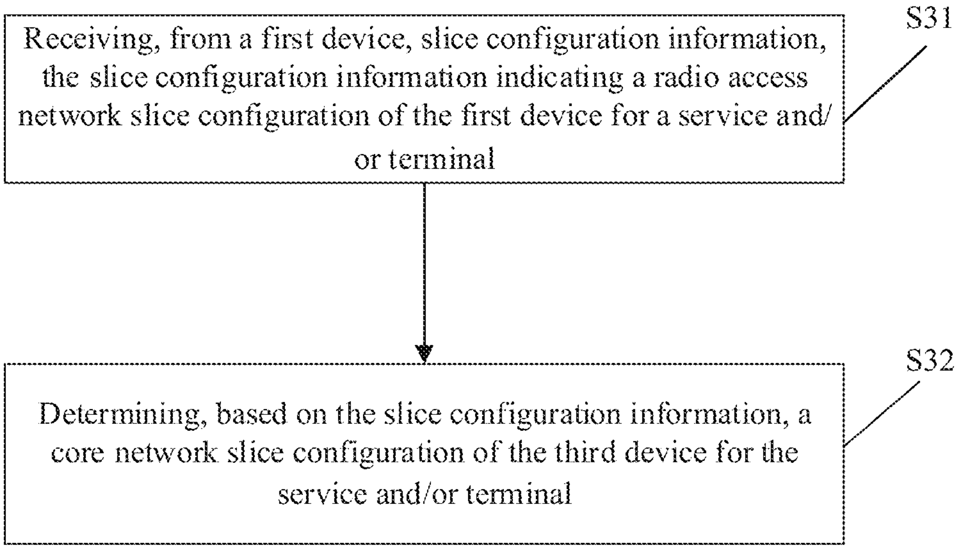
FIG. 5 is a flowchart of a method for processing a slice service according to an embodiment.

FIG. 5 is a flow diagram of a method for processing a slice service according to an embodiment, and the method for processing the slice service is applied in a third device. The third device may be understood to be a device that receives a radio access network slice configuration for a service and/or terminal, which may for example be a core network device (AMF/MME) and the like. Referring to FIG. 5, the method for processing the slice service includes:

step S31, receiving, from a first device, slice configuration information, the slice configuration information indicating a radio access network slice configuration of the first device for a service and/or terminal; and step S32, determining, based on the slice configuration information, a core network slice configuration of the third device for the service and/or terminal.

In an embodiment, the third device may also determine, based on slice policy information, the core network slice configuration of the third device for the service and/or terminal, and the slice policy information indicates a core network slice policy for the service and/or terminal.

In an embodiment, the slice policy information includes at least one or a combination of: information associated with a slice fallback; a target slice, an alternative slice and a slice list for the first device; a matching relationship between a slice for a core network and a slice for a radio access network; an area in which the slice policy information comes into effect; a time at which the slice policy information comes into effect; and a usage restriction for the slice.

In an embodiment, the slice configuration information is sent through a path switch request.

In an embodiment, the slice configuration information includes a radio access network slice identification of the first device for the service and/or terminal. The third device may determine a core network slice configuration of the third device for the service and/or terminal based on the radio access network slice identification and/or the slice policy information.

In an embodiment, the third device sends a notification for releasing the service and/or terminal to the first device if the third device does not support the slice associated with the slice identification information.

In another embodiment, the third device may send, to the first terminal, a slice update indication associated with the core network slice configuration of the third device for the service and/or terminal to update the radio access network slice identification of the first device for the service and/or terminal.

In an embodiment, the slice update indication may include a core network slice identification for the service and/or terminal. The first device autonomously determines the updated radio access network slice identification for the service and/or terminal based on the core network slice identification. In another embodiment, the slice update indication may include an updated radio access network slice identification for the service and/or terminal determined by the core network. The first device performs a corresponding slice configuration based on the updated radio access network slice identification for the service and/or terminal.

In another embodiment, the slice configuration information includes fallback indication information, and in response to the fallback indication information indicating that a slice fallback has occurred in the first device for the service and/or terminal, it is determined that the core network performs a slice fallback for the service and/or terminal.

In an embodiment of the present disclosure, in a service and/or terminal switching scenario, the slice policy information may be sent or received between the first device and the second device based on a switch request. That is, the second device carries the slice policy information for the service and/or terminal in the switch request sent to the second device for sending, and the first device receives the switch request sent by the second device and obtains the slice policy information for the service and/or terminal based on the switch request.

On the one hand, the scenario in which the service and/or terminal switch occurs may also be a scenario in which the switch based on the Xn interface occurs. The second device may send the slice policy information for the service and/or terminal based on the Xn interface, and the second device may be a radio access network device, such as a source base station. The first device receives the slice policy information for the service and/or terminal based on the Xn interface. On the other hand, the scenario in which the service and/or terminal switch occurs may be a scenario in which the switch based on the NG interface occurs, the second device may also send the slice policy information for the service and/or terminal based on the NG interface, and the second device may be an AMF/MME. The first device receives the slice policy information for the service and/or terminal based on the NG interface.

Embodiments of the present disclosure are described below respectively for the scenario in which the service and/or terminal switch based on the NG interface occurs, and for scenario in which the service and/or terminal switch based on the Xn interface occurs.

First, the scenario in which the switch based on the NG interface occurs is described. In the case where the switch based on the NG interface occurs, the first device is a target base station and the second device is a core network device, e.g., an AMF/MME. It is illustrated below by taking the second device as the AMF/MME.

Figure 6:
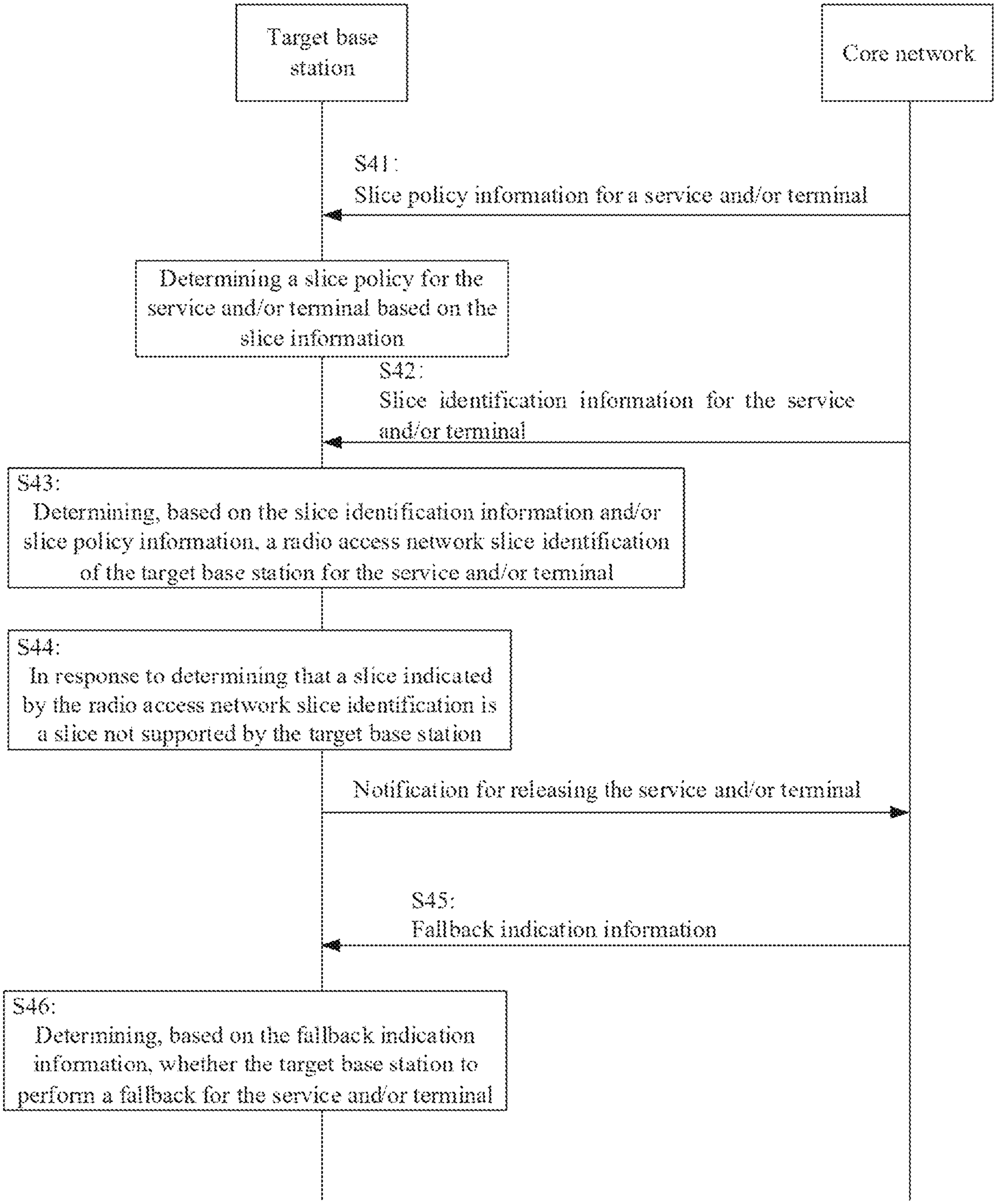
FIG. 6 is a flowchart of a method for processing a slice service in a scenario where a switch based on an NG interface occurs according to an embodiment.

FIG. 6 is a flowchart of a method for processing a slice service in a scenario where a switch based on an NG interface occurs, according to an embodiment. Referring to FIG. 6, the following steps are included.

In step S41, an AMF/MME sends slice policy information for a service and/or terminal, a target base station receives the slice policy information for the service and/or terminal sent by the AMF/MME, and the target base station determines a slice policy for the service and/or terminal based on the slice policy information.

The service is identified by a protocol data unit (PDU) session identification.

The slice policy information for the service and/or terminal sent by the AMF/MME includes at least one of information associated with a slice fallback; a target slice, an alternative slice and a slice list for the first device; a matching relationship between a slice for a core network and a slice for a radio access network; an area in which the slice policy information comes into effect; a time at which the slice policy information comes into effect; and a usage restriction for the slice.

The AMF/MME may carry the slice policy information for the service and/or terminal in a switch request sent to the target base station. The target base station receives the slice policy information for the service and/or terminal sent by the AMF/MME based on the switch request sent by the AMF/MME to the target base station.

The slice policy information for the service and/or terminal sent by the AMF/MME may be determined based on the slice policy information provided by a PCF/PCRF. The slice policy information provided by the PCF/PCRF may be slice policy information configured separately in the core network and the radio access network.

In step S42, the AMF/MME sends slice identification information for the service and/or terminal. The target base station receives the slice identification information for the service and/or terminal from the core network.

The slice identification information sent by the AMF/MME includes at least one of a radio access network target slice identification for the service and/or terminal, a core network slice identification for the service and/or terminal, and a radio access network alternative slice identification for the service and/or terminal. In an embodiment, the radio access network target slice identification or radio access network alternative slice identification for the service and/or terminal may be the same as the target slice or alternative slice in the slice information included in the previously mentioned slice policy information for the service and/or terminal, which have a replacement relationship. In an embodiment, if one of the slice identification information and the slice policy information already includes information about the radio access network target slice and/or alternative slice for the service and/or terminal, the other does not need to include such information.

In an embodiment of the present disclosure, the AMF/MME sends the slice identification information for the service and/or terminal in a switch request sent to the target base station, for example, providing PDU session slice identification information (e.g., S-NSSAI). The PDU session slice identification information includes at least one of PDU session target slice identification, slice identification selected by the core network, PDU session alternative slice. The target base station receives the slice identification information for the service and/or terminal through the switch request sent by the AMF/MME to the target base station.

In step S43, the target base station determines, based on the slice identification information and/or the slice policy information, a radio access network slice identification of the target base station for the service and/or terminal.

The target base station, upon receiving the slice identification information from the AMF/MME, determines the access network slice identification corresponding to the PDU session. For example, when only the core network slice identification for the service and/or terminal is included in the slice identification information, the target base station selects the radio access network slice matching the core network slice based on information such as the core network slice identification and the matching relationship between the slice for the core network and the slice for the radio access network in the slice policy information received by the target base station.

In an embodiment of the present disclosure, if the slice indicated by the radio access network slice identification determined by the target base station is a slice that is not supported by the target base station, step S44 is performed.

In step S44, in response to the slice indicated by the radio access network slice identification being a slice that is not supported by the target base station, a notification is sent to the AMF/MME to release the service and/or terminal. The AMF/MME receives the notification for releasing the service and/or terminal and releases the service and/or terminal.

For example, if the target base station cannot select a slice to support the PDU session, it sends a notification message to the core network to notify the AMF/MME to release the PDU session. After the AMF/MME receives the notification message, it releases the PDU session.

Further, in an embodiment of the present disclosure, the core network may send, to the target base station, fallback indication information for indicating whether a slice fallback has occurred in the core network for the service and/or terminal, so that the target base station determines whether to perform the slice fallback for the service and/or terminal based on the fallback indication information.

In step S45, the AMF/MME sends the fallback indication information and the target base station receives the fallback indication information. The fallback indication information indicates whether a slice fallback has occurred in the core network for the service and/or terminal.

In particular, the AMF/MME may carry the fallback indication information in the switch request sent to the target base station. The target base station receives the fallback indication information based on the switch request sent by the AMF/MME. For example, the AMF/MME provides, in the switch request sent to the target base station, the fallback indication information regarding whether a slice fallback has occurred in the PDU session or not. The target base station receives, based on the switch request sent by the AMF/MME to the target base station, the fallback indication information regarding whether the slice fallback has occurred in the PDU session or not.

In step S46, the target base station determines, based on the fallback indication information, whether the target base station performs a fallback for the service and/or terminal.

It may be understood that the steps shown in FIG. 6 in embodiments of the present disclosure are not all mandatory steps, and some of the steps are optional steps. For example, step S45 and step S46 are optional steps. Step S44 is an optional step. Steps S42 and S43 are also optional steps.

The above method for processing the slice service in the scenario where the switch based on the NG interface occurs will be described below in conjunction with an example of the present disclosure. The PCF sends a route selection policy for a terminal service to the AMF. The route selection policy includes slice policy information, which includes whether a slice fallback is allowed, a target slice, an alternative slice, whether slices selected by the core network and the RAN need to be the same and the like. When the switch based on the NG interface occurs, the source base station sends a switch indication to the AMF/MME. The AMF/MME determines, according to the slice policy, whether the core network needs to perform slice remapping or slice fallback on the terminal PDU session (e.g. which slices are supported by the AMF/MME, which slices can be used in the current geographical area, the target slice of the PDU session, whether (such as which slices are supported by AMF/MME, which slices can be used in the current geographical area, the target slice of the PDU session, whether the terminal has other PDU sessions using slices that cannot be used at the same time as the current slice, whether fallback is allowed, etc.). If it needs to perform the slice remapping or slice fallback on the terminal PDU session, the slice carrying the PDU session is remapped to a new slice or is fallback to not be carried via the slice. Then, the AMF/MME sends a switch request to the target base station and carries the slice policy information of the PDU session and the core network slice identification information in the switch request. Based on the slice policy information, the target base station determines whether it needs to be consistent with the slice selected by the core network. If it needs to be consistent with the slice selected by the core network, it selects the slice selected by the core network (if the core network slice is fallback, the access network slice is also fallback). In an embodiment, if the target base station cannot support the slice selected by the core network, the AMF/MME is instructed to release the PDU session. If it does not need to be consistent with the slice selected by the core network, the target base station preferentially selects the target slice of the PDU session to carry the terminal service. If the target base station cannot support the target slice, it selects a slice from the alternative slice (in order of priority) to carry the service, while ensuring that the selected slice is valid/effective in the current geographical area. In an embodiment, the target base station is also required to determine whether the current time is within the effective time period specified in the slice policy.

In an embodiment of the present disclosure, when the switch based on the NG interface occurs, if the target base station does not support the slice corresponding to the service, i.e., the original slice cannot be provided to carry the service, the target base station determines the slice policy based on the slice policy information for the terminal and/or service, e.g., uses a new slice to carry the service, which may ensure the service QoS to a some extent without interrupting the service.

The scenario where the switch based on the Xn interface occurs is first described. In the scenario where the switch based on the Xn interface occurs, the first device is a target base station and the second device is a radio access network device, such as a source base station. The following is described by taking that the second device is the source base station as an example.

Figure 7:
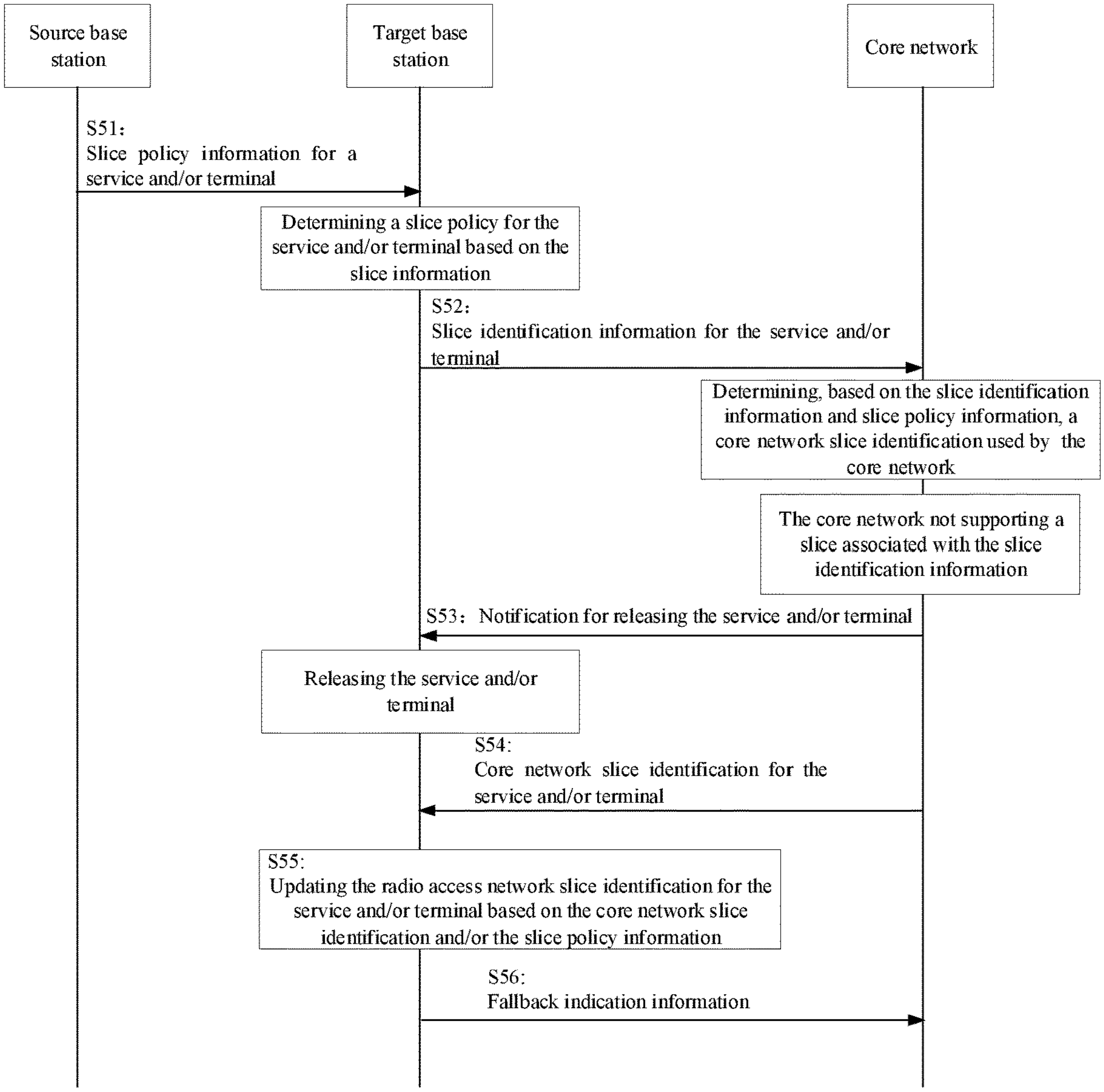
FIG. 7 is a flowchart of a method for processing a slice service in a scenario where a switch based on an Xn interface occurs according to an embodiment.

FIG. 7 is a flowchart of a method for processing a slice service in the scenario where a switch based on an Xn interface occurs according to an embodiment. Referring to FIG. 7, the following steps are included.

In step S51, the source base station sends slice policy information of a service and/or terminal, the target base station receives the slice policy information for the service and/or terminal sent by the source base station, and the target base station determines a slice policy for the service and/or terminal based on the slice policy information.

The service is identified by a protocol data unit (PDU) session identification.

The slice policy information for the service and/or terminal sent by the source base station includes at least one of information associated with a slice fallback; a target slice, an alternative slice and a slice list for the first device; a matching relationship between a slice for a core network and a slice for a radio access network; an area in which the slice policy information comes into effect; a time at which the slice policy information comes into effect; and a usage restriction for the slice.

The source base station may carry the slice policy information for the service and/or terminal in a switch request sent to the target base station. The target base station receives the slice policy information for the service and/or terminal sent by the source base station based on the switch request sent by the source base station to the target base station.

The slice policy information sent by the source base station for the service and/or the terminal may be the slice policy information provided by the AMF to the source base station. The slice policy information provided by the AMF to the source base station is determined based on the slice policy information provided by the PCF/PCRF. The slice policy information provided by the PCF/PCRF may be slice policy information configured separately in the core network and the radio access network.

In step S52, the target base station sends slice identification information for the service and/or terminal to the core network. The core network receives the slice identification information for the service and/or terminal and, based on the slice identification information and the slice policy information, determines the core network slice identification used by the core network.

The slice identification information sent by the target base station includes a radio access network slice identification of the target base station for the service and/or terminal.

In an embodiment, the radio access network slice identification information of the target base station for the service and/or terminal may include a radio access network target slice identification or a radio access network alternative slice identification for the service and/or terminal. The radio access network target slice identification or radio access network alternative slice identification for the service and/or terminal may be the same as the target slice or alternative slice in the slice information included in the previously mentioned slice policy information for the service and/or terminal, which have a replacement relationship. In an embodiment, if one of the slice identification information and the slice policy information already includes information about the radio access network target slice and/or alternative slice for the service and/or terminal, the other does not need to include such information.

In an embodiment of the present disclosure, the target base station may send the slice identification information for the service and/or terminal in a path switch request sent to the AMF/MME. For example, the target base station provides the slice identification information of the PDU session (e.g., S-NSSAI) in the path switch request sent to the AMF/MME.

After receiving the slice identification information from the target base station, the core network determines the slice associated with the slice identification information based on the slice identification information. If the core network does not support the slice associated with the slice identification information, the core network sends a notification for releasing the service and/or terminal to the target base station.

In step S53, the target base station receives the notification for releasing the service and/or terminal, and releases the service and/or terminal. The notification received by the target base station for releasing the service and/or terminal is sent by the core network in response to the core network not supporting the slice associated with the slice identification information.

For example, after receiving the radio access network slice identification of the PDU session from the target base station, the AMF determines the core network slice identification corresponding to the PDU session. If the AMF/MME cannot select, in the core network, a slice that supports the PDU session according to the slice identification information, it notifies the target base station to release the PDU session.

In an embodiment of the present disclosure, if the core network supports the slice associated with the slice identification information and selects the core network slice according to the slice identification information, the core network slice identification for the service and/or terminal is sent to the target base station.

In step S54, the core network slice identification for the service and/or terminal is received from the core network.

In step S55, the radio access network slice identification for the service and/or terminal is updated based on the core network slice identification and/or the slice policy information.

Further, in an embodiment of the present disclosure, the target base station may send, to the core network, a fallback indication information for indicating whether a slice fallback has occurred in the target base station for the service and/or terminal.

In step S56, the target base station sends the fallback indication information to the core network (AMF/MME), and the core network (AMF/MME) receives the fallback indication information.

The target base station may send, in a path switch request sent to the AMF/MME, the fallback indication information for the service and/or terminal to indicate whether a slice fallback has occurred in the target base station for the service and/or terminal.

It may be understood that the steps shown in FIG. 7 in embodiments of the present disclosure are not all mandatory steps, and some of the steps are optional steps. For example, step S56 is an optional step. Step S54 and step S55 are optional steps. Steps S52 and S53 are also optional steps.

The above method for processing the slice service in the scenario where the switch based on the Xn interface occurs will be described below in conjunction with an example of the present disclosure. The PCF sends a route selection policy for a terminal to the AMF. The route selection policy includes slice policy information. The AMF sends the slice policy information to the source base station. When the switch based on the Xn interface occurs, the source base station sends the slice policy information to the target base station via a switch request command, and the target base station determines whether the PDU session of the terminal may be carried via the target slice. The basis for the target base station to determine whether the PDU session of the terminal may be carried via the target slice includes that whether the target base station supports the target slice, whether the current geographical area allows the target slice, or whether the terminal has other PDU sessions using slices that cannot be used at the same time as the target slice and the like. If the target base station supports the target slice, the PDU session is carried by the target slice. If the target base station does not support the target slice, it further determines whether the slice can be carried by an alternative slice. If it can be carried by an alternative slice, the base station supports the alternative slice and the current geographical area allows the alternative slice, the PDU session may be carried on the alternative slice. If it cannot be carried by the alternative slice, it determines whether the service carried on the slice supports fallback to a non-slice. If the fallback to the non-slice is supported, the PDU session may be carried in a radio resource not provided by way of the slice. If the fallback to the non-slice is not supported, no radio resources are provided for the PDU session (i.e., the radio side does not establish the resource for the PDU session). After the radio-side switch is completed, the target base station sends the slice selected by the radio access network side of the PDU session to the AMF, which determines the slice identification selected by the core network of the PDU session based on the slice identification selected by the RAN side. The principle of the AMF for determining the slice identification selected by the core network may be, for example, to preferentially ensure that the slice identification selected is the same as the slice identification selected by the radio access network side. If it cannot ensure that the slice identification selected by the core network is the same as the slice identification selected by the radio access network side, then other supported slices may be selected. Or it must ensure that the slice identification selected by the core network is the same as the slice identification selected by the radio access network side, and if the slice identification selected by the core network is not the same as the slice identification selected by the radio access network side, the target base station will be notified to release the PDU session.

In an embodiment of the present disclosure, when the switch based on the Xn interface occurs, if the target base station does not support the slice corresponding to the service, i.e., an original slice cannot be provided to carry the service, the slice policy is determined based on the slice policy information for the terminal and/or service, for example, using a new slice to carry the service, which can ensure the service QoS to some extent without interrupting the service.

Based on the same concept, an embodiment of the present disclosure also provides a device for processing a slice service.

It can be understood that the device for processing the slice service provided by embodiments of the present disclosure includes hardware structures and/or software modules for performing respective functions in order to achieve the above-mentioned functions. In combination with the units and algorithmic steps of the various examples disclosed in the embodiments of the present disclosure, the embodiments of the present disclosure can be implemented in the form of hardware or a combination of hardware and computer software. Whether a particular function is performed as hardware or computer software driving hardware depends on the particular application and design constraints of the technical solution. The person skilled in the art may use a different approach for each particular application to implement the described functionality, but such implementation should not be considered as going beyond the scope of the technical solution of the embodiments of the present disclosure.

Figure 8:
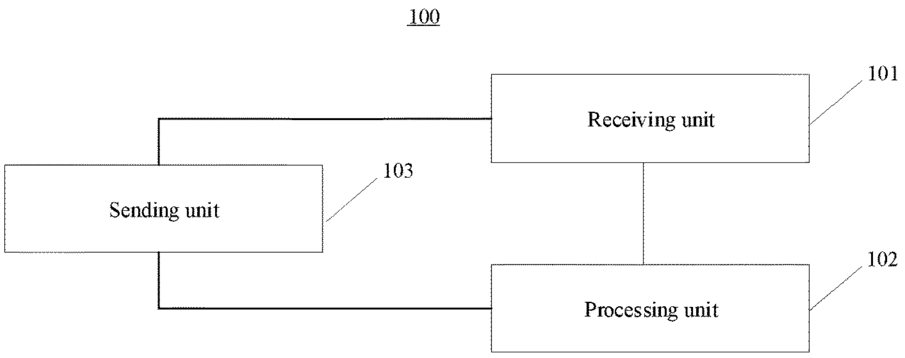
FIG. 8 is a block diagram of a device for processing a slice service according to an embodiment.

FIG. 8 is a block diagram of a device for processing a slicing service according to an embodiment. Referring to FIG. 8, the device for processing the slicing service 100 includes a receiving unit 101 and a processing unit 102.

The receiving unit 101 is configured to receive slice policy information for a service and/or terminal; and the processing unit 102 is configured to determine a slice policy for the service and/or terminal based on the slice policy information, the slice policy being configured to determine a slice configuration of the first device for the service and/or terminal.

In an embodiment, the receiving unit 101 obtains the slice policy information for the service and/or terminal based on a switch request received.

In another embodiment, the slice policy information includes at least one or a combination of:

information associated with a slice fallback; a target slice, an alternative slice and a slice list for the first device; a matching relationship between a slice for a core network and a slice for a radio access network; an area in which the slice policy information comes into effect; a time at which the slice policy information comes into effect; and a usage restriction for the slice.

In yet another embodiment, the slice policy information is different from slice policy information employed by a core network.

In yet another embodiment, the slice policy information is received from a core network through a NG interface.

In yet another embodiment, the slice policy information is received from a radio access network device through a Xn interface.

In yet another embodiment, the receiving unit 101 is further configured to:

receive, from the core network, slice identification information for the service and/or terminal, the slice identification information including at least one of a radio access network target slice identification for the service and/or terminal, a core network slice identification for the service and/or terminal, and a radio access network alternative slice identification for the service and/or terminal; and determine, based on the slice identification information and/or the slice policy information, a radio access network slice identification of the first device for the service and/or terminal.

In yet another embodiment, the device for processing the slice service 100 further includes a sending unit 103 configured to:

send, in response to determining that a slice indicated by the radio access network slice identification is a slice not supported by the first device, a notification to the core network to release the service and/or terminal.

In yet another embodiment, the receiving unit 101 is further configured to:

receive, from the core network, fallback indication information; and determine, in response to the fallback indication information indicating that a slice fallback has occurred in the core network for the service and/or terminal, that the first device performs a fallback for the service and/or terminal.

In yet another embodiment, the slice identification information or the fallback indication information is received through a switch request.

In yet another embodiment, the device for processing the slice service 100 further includes a sending unit 103 configured to:

send slice identification information to a core network, the slice identification information including a radio access network slice identification of the first device for the service and/or terminal.

In yet another embodiment, the receiving unit 101 is further configured to:

receive a notification for releasing the service and/or terminal, the notification being sent in response to the core network not supporting a slice associated with the slice identification information.

In yet another embodiment, the device for processing the slice service 100 further includes a sending unit 103, configured to:

send fallback indication information to a core network, the fallback indication information indicating that a slice fallback has occurred or not occurred in the first device for the service and/or terminal.

In yet another embodiment, the slice identification information or the fallback indication information is sent through a path switch request.

In yet another embodiment, the receiving unit 101 is further configured to:

receive, from the core network, a slice update indication for the service and/or terminal; and update the radio access network slice identification for the service and/or terminal based on the slice update indication and/or the slice policy information.

Figure 9:
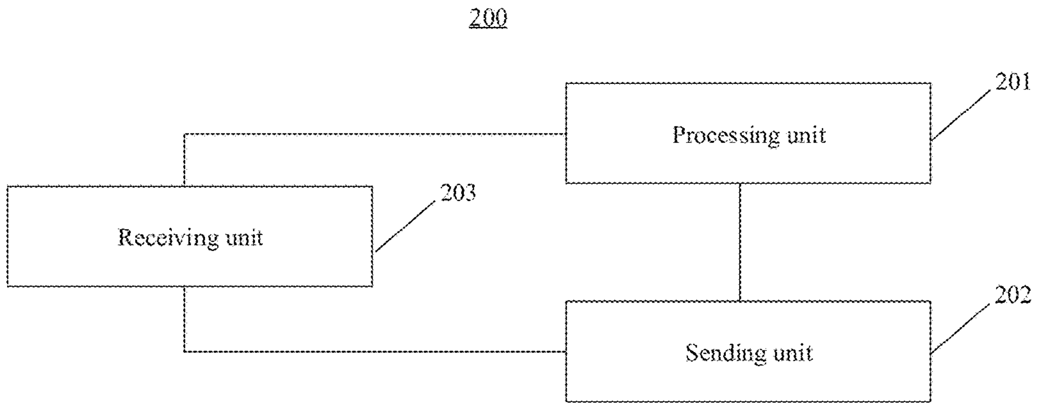
FIG. 9 is a block diagram of a device for processing a slice service according to an embodiment.

FIG. 9 is a block diagram of a device for processing a slice service according to an embodiment. Referring to FIG. 9, the device for processing the slice service 200 includes a processing unit 201 and a sending unit 203.

The processing unit 201 is configured to determine slice policy information for a service and/or terminal, the slice policy information being configured for a first device to determine a slice policy for the service and/or terminal, and the slice policy being configured to determine a slice configuration of the first device for the service and/or terminal; and the sending unit 203 is configured to send the slice policy information for the service and/or terminal.

In an embodiment, the sending unit 203 sends the slice policy information for the service and/or terminal through a switch request.

In another embodiment, the slice policy information includes at least one or a combination of:

information associated with a slice fallback; a target slice, an alternative slice and a slice list for the first device; a matching relationship between a slice for a core network and a slice for a radio access network; an area in which the slice policy information comes into effect; a time at which the slice policy information comes into effect; and a usage restriction for the slice.

In yet another embodiment, the slice policy information is different from slice policy information employed by a core network.

In yet another embodiment, the slice policy information is sent by a core network through a NG interface.

In yet another embodiment, the slice policy information is sent by a radio access network device through a Xn interface.

In yet another embodiment, the sending unit 202 is further configured to:

send, from the core network, slice identification information for the service and/or terminal, the slice identification information including at least one of a radio access network target slice identification for the service and/or terminal, a core network slice identification for the service and/or terminal, and a radio access network alternative slice identification for the service and/or terminal.

In yet another embodiment, the device for processing the slice service 200 further includes a receiving unit 203 configured to:

receive, from the first device, a notification for releasing the service and/or terminal, the notification being sent by the first device based on the slice identification information.

In yet another embodiment, the sending unit 202 is further configured to:

send fallback indication information, the fallback indication information indicating that a slice fallback has occurred or not occurred in the core network for the service and/or terminal.

In yet another embodiment, the slice identification information or the fallback indication information is sent through a switch request.

Figure 10:
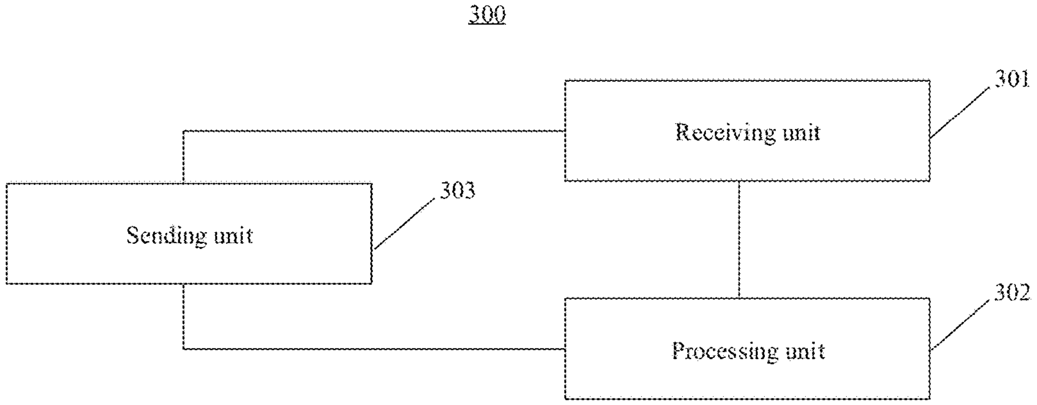
FIG. 10 is a block diagram of a device for processing a slice service according to an embodiment.

FIG. 10 is a block diagram of a device for processing a slicing service according to an embodiment. Referring to FIG. 10, the device for processing the slicing service 300 includes a receiving unit 301 and a processing unit 302.

The receiving unit 301 is configured to receive, from a first device, slice configuration information, the slice configuration information indicating a radio access network slice configuration of the first device for a service and/or terminal; and the processing unit 302 is configured to determine, based on the slice configuration information, a core network slice configuration of a third device for the service and/or terminal.

The processing unit 302 determines, based on slice policy information, the core network slice configuration of the third device for the service and/or terminal, the slice policy information indicating a core network slice policy for the service and/or terminal.

The slice policy information includes at least one or a combination of:

information associated with a slice fallback; a target slice, an alternative slice and a slice list for the first device; a matching relationship between a slice for a core network and a slice for a radio access network; an area in which the slice policy information comes into effect; a time at which the slice policy information comes into effect; and a usage restriction for the slice.

The slice configuration information is sent through a path switch request.

In an embodiment, the slice configuration information includes a radio access network slice identification of the first device for the service and/or terminal.

In an embodiment, the device for processing the slice service 300 further includes a sending unit 303 configured to:

send, in response to not supporting a slice associated with the slice identification information, a notification for releasing the service and/or terminal to the first device.

In another embodiment, the device for processing the slice service 300 further includes a sending unit 303 configured to:

send, to the first terminal, a slice update indication associated with the core network slice configuration of the third device for the service and/or terminal to update the radio access network slice identification of the first device for the service and/or terminal.

In yet another embodiment, the slice configuration information includes fallback indication information, and the processing unit 302 is further configured to:

in response to the fallback indication information indicating that a slice fallback has occurred in the first device for the service and/or terminal, determine that the core network performs a slice fallback for the service and/or terminal.

The slice configuration information or the fallback indication information is sent through a path switch request.

With respect to the devices in the above embodiments, the specific manners in which the respective modules perform their operations have been described in detail in the method embodiments and will not be described in detail here.

Figure 11:
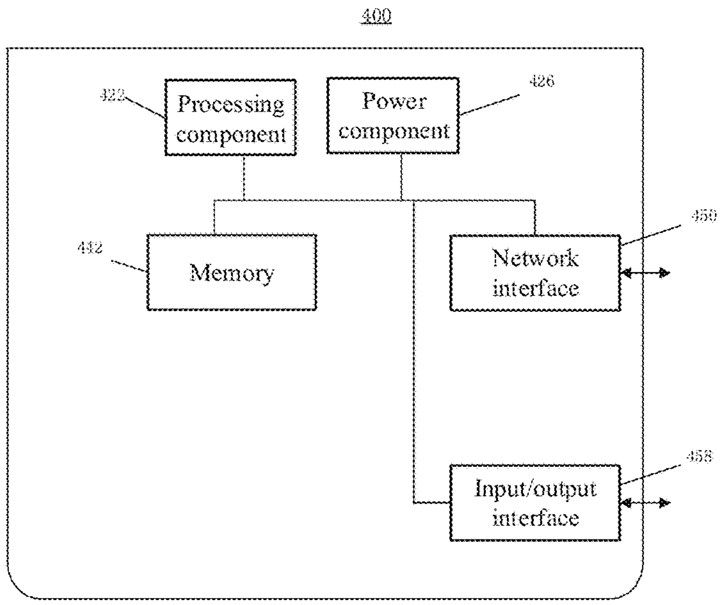
FIG. 11 is a block diagram of a device for processing a slice service according to an embodiment.

FIG. 11 is a block diagram of a device for processing a slice service 400 according to an embodiment. For example, the device 400 may be provided as a network device, such as a base station. Referring to FIG. 11, the device 400 includes a processing component 422 which further includes one or more processors, and a memory resource which is represented by a memory 442 and is configured for storing instructions such as application programs executable by the processing component 422. The application program stored in the memory 442 may include one or more modules each corresponding to a set of instructions. Furthermore, the processing component 422 is configured to execute instructions to perform the above method.

The device 400 may also include a power component 426 configured to perform power management of the device 400, a wired or wireless network interface 450 configured to connect the device 400 to a network, and an input/output (I/O) interface 458. The device 400 may operate based on an operating system stored in memory 432, such as Windows Server™ Mac OS X™, Unix™, Linux™, Free BSD™ or the like.

An embodiment also provides a non-transitory computer-readable storage medium including instructions, such as the memory 442 including instructions, and the instructions may be executed by the processing component 422 of the device 400 to complete the foregoing method. For example, the non-transitory computer-readable storage medium may be ROM, random access memory (RAM), CD-ROM, magnetic tape, floppy disk, optical data storage device and the like.

The technical solution provided by the embodiment of the present disclosure may bring the following technical effect.

A first device receives slice policy information for a service and/or a terminal and determines a slice policy for the service and/or the terminal based on the slice policy information, and then can determine a slice configuration of the first device for the service and/or the terminal, which avoids a service interruption to some extent, and thus improves the quality of service (QoS) of the service.

It is further understood that the term "plurality" in the present disclosure means two or more, and other quantifiers are similar. The term "and/or", describing the association of associated objects, indicates that three relationships can exist, for example, A and/or B, which can indicate the presence of A alone, A and B together, and B alone. The character "/" generally indicates an "or" relationship between the preceding and following associated objects. The singular forms "a", "said" and "the" are also intended to include plural forms, unless the context clearly indicates otherwise.

It is further understood that the terms "first," "second" and the like are used to describe a variety of information, but that such information should not be limited to these terms. These terms are only used to distinguish information of the same type from one another and do not indicate a particular order or level of importance. In fact, the expressions "first" and "second" may be used interchangeably. For example, without departing from the scope of the present disclosure, first information may also be referred to as second information, and similarly, second information may also be referred to as first information.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

It is further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

Those skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for processing a slice service, comprising:

receiving, by a first device, slice policy information for at least one of a service and a terminal, wherein the first device is a target access network device after switch of the at least one of the service and the terminal occurs; and determining, by the first device, a slice policy for the at least one of the service and the terminal based on the slice policy information, wherein the slice policy is configured to determine a slice configuration of the first device for the at least one of the service and the terminal, wherein receiving the slice policy information for the at least one of the service and the terminal comprises:

obtaining the slice policy information for the at least one of the service and the terminal based on a switch request received, wherein the slice policy information is received from a core network through an NG interface, and wherein the slice policy information comprises at least one of the following information:

information associated with a slice fallback, the information associated with the slice fallback being configured to indicate whether a service carried on a slice is permitted to fall back from slice-based transmission to non-slice-based transmission; a matching relationship between a slice for the core network and a slice for a radio access network; an area in which the slice policy information comes into effect; a time at which the slice policy information comes into effect; and a usage restriction for the slice, the usage restriction being configured to indicate which slices cannot be used simultaneously.

2. The method for processing the slice service according to claim 1, wherein the slice policy information further comprises at least one of:

a target slice, an alternative slice or a slice list for the first device.

3. The method for processing the slice service according to claim 1, wherein the slice policy information for the at least one of the service and the terminal is different from slice policy information employed by the core network.

4. The method for processing the slice service according to claim 1, further comprising:

receiving, by the first device and from the core network, slice identification information for the at least one of the service and the terminal, wherein the slice identification information comprises at least one of the following identifications: a radio access network target slice identification for the at least one of the service and the terminal, a core network slice identification for the at least one of the service and the terminal, or a radio access network alternative slice identification for the at least one of the service and the terminal; and determining, by the first device and based on at least one of the slice identification information or the slice policy information, a radio access network slice identification of the first device for the at least one of the service and the terminal.

5. The method for processing the slice service according to claim 4, further comprising: sending, by the first device and in response to determining that a slice indicated by the radio access network slice identification is a slice not supported by the first device, a notification to the core network to release the at least one of the service and the terminal.

6. The method for processing the slice service according to claim 1, further comprising:

receiving, by the first device and from the core network, fallback indication information; and determining, by the first device and in response to the fallback indication information indicating that a slice fallback has occurred in the core network for the at least one of the service and the terminal, that the first device performs a fallback for the at least one of the service and the terminal.

7. The method for processing the slice service according to claim 1, further comprising:

sending, by the first device, slice identification information to the core network, wherein the slice identification information comprises a radio access network slice identification of the first device for the at least one of the service and the terminal.

8. The method for processing the slice service according to claim 7, further comprising:

receiving, by the first device, a notification for releasing the at least one of the service and the terminal, wherein the notification is sent in response to determining that the core network does not support a slice associated with the slice identification information; and sending, by the first device, fallback indication information to the core network, wherein the fallback indication information indicates that a slice fallback has occurred or has not occurred in the first device for the at least one of the service and the terminal.

9. The method for processing the slice service according to claim 7, further comprising:

receiving, by the first device and from the core network, a slice update indication for the at least one of the service and the terminal; and updating, by the first device, the radio access network slice identification for the at least one of the service and the terminal based on at least one of the slice update indication or the slice policy information.

10. The method for processing the slice service according to claim 1, wherein the usage restriction is configured to constrain the slice configuration of the first device based on which slices cannot be used simultaneously.

11. A method for processing a slice service, comprising:

determining, by a second device, slice policy information for at least one of a service and a terminal, the second device being a core network device before switch of the at least one of the service and the terminal occurs, wherein the slice policy information is configured for a first device to determine a slice policy for the at least one of the service and the terminal, wherein the slice policy is configured to determine a slice configuration of the first device for the at least one of the service and the terminal, and the first device is a target access network device after switch of the at least one of the service and the terminal occurs; and sending, by the second device, the slice policy information for the at least one of the service and the terminal, wherein sending the slice policy information for the at least one of the service and the terminal comprises:

sending the slice policy information for the at least one of the service and the terminal through a switch request, wherein the slice policy information is sent by a core network through an NG interface, and wherein the slice policy information comprises:

information associated with a slice fallback, the information associated with the slice fallback being configured to indicate whether a service carried on a slice is permitted to fall back from slice-based transmission to non-slice-based transmission; a matching relationship between a slice for the core network and a slice for a radio access network; an area in which the slice policy information comes into effect; a time at which the slice policy information comes into effect; and a usage restriction for the slice, the usage restriction being configured to indicate which slices cannot be used simultaneously.

12. The method for processing the slice service according to claim 11, wherein the slice policy information further comprises at least one of:

a target slice, an alternative slice or a slice list for the first device.

13. The method for processing the slice service according to claim 11, further comprising:

sending, by the second device, slice identification information for the at least one of the service and the terminal, wherein the slice identification information comprises at least one of the following identifications: a radio access network target slice identification for the at least one of the service and the terminal, a core network slice identification for the at least one of the service and the terminal, or a radio access network alternative slice identification for the at least one of the service and the terminal; and sending, by the second device, fallback indication information, wherein the fallback indication information indicates that a slice fallback has occurred or has not occurred in the core network for the at least one of the service and the terminal.

14. The method for processing the slice service according to claim 13, further comprising:

receiving, by the second device and from the first device, a notification for releasing the at least one of the service and the terminal, wherein the notification is sent by the first device based on the slice identification information.

15. The method for processing the slice service according to claim 11, wherein the usage restriction is configured to constrain the slice configuration of the first device based on which slices cannot be used simultaneously.

16. A method for processing a slice service, comprising:

receiving, by a third device and from a first device, slice configuration information, wherein the slice configuration information indicates a radio access network slice configuration of the first device for at least one of a service and a terminal, the third device is a core network device, and the first device is a target access network device after switch of the at least one of the service and the terminal occurs; and determining, by the third device and based on the slice configuration information, a core network slice configuration of the third device for the at least one of the service and the terminal, wherein determining the core network slice configuration of the third device for the at least one of the service and the terminal comprises:

determining, based on slice policy information, the core network slice configuration of the third device for the at least one of the service and the terminal, the slice policy information indicating a core network slice policy for the at least one of the service and the terminal, wherein the slice policy information comprises:

information associated with a slice fallback, the information associated with the slice fallback being configured to indicate whether a service carried on a slice is permitted to fall back from slice-based transmission to non-slice-based transmission; a matching relationship between a slice for a core network and a slice for a radio access network; an area in which the slice policy information comes into effect; a time at which the slice policy information comes into effect; and a usage restriction for the slice, the usage restriction being configured to indicate which slices cannot be used simultaneously.

17. The method for processing the slice service according to claim 16, wherein the slice configuration information comprises a radio access network slice identification of the first device for the at least one of the service and the terminal.

18. The method for processing the slice service according to claim 17, further comprising: sending, by the third device and in response to determining that the third device does not support a slice associated with slice identification information, a notification for releasing the at least one of the service and the terminal to the first device.

19. The method for processing the slice service according to claim 17, further comprising: sending, by the third device and to the first device, a slice update indication associated with the core network slice configuration of the third device for the service or the terminal to update the radio access network slice identification of the first device for the at least one of the service and the terminal.

20. The method for processing the slice service according to claim 16, wherein the usage restriction is configured to constrain the slice configuration of the first device based on which slices cannot be used simultaneously.

* * * * *